(12) United States Patent
Wawda et al.

(10) Patent No.: US 11,159,550 B1
(45) Date of Patent: Oct. 26, 2021

(54) CORRECTING TIMESTAMPS FOR COMPUTER SECURITY TELEMETRY DATA

(71) Applicant: Chronicle LLC, Mountain View, CA (US)

(72) Inventors: Abu Wawda, Cupertino, CA (US); Tushar Dhoot, San Francisco, CA (US); Kai Boon Ee, Sunnyvale, CA (US); Charles Stephen Spirakis, Mountain View, CA (US); Tali Leora Eban, Sunnyvale, CA (US)

(73) Assignee: Chronicle LLC, Mountain View, CA (US)

( * ) Notice: Subject to any disclaimer, the term of this patent is extended or adjusted under 35 U.S.C. 154(b) by 203 days.

(21) Appl. No.: 16/290,776

(22) Filed: Mar. 1, 2019

(51) Int. Cl.
*H04L 29/06* (2006.01)

(52) U.S. Cl.
CPC ........ *H04L 63/1425* (2013.01); *H04L 63/302* (2013.01); *H04L 63/306* (2013.01)

(58) Field of Classification Search
CPC .. H04L 63/1425; H04L 63/302; H04L 63/306
USPC .......................................................... 726/23
See application file for complete search history.

(56) References Cited

U.S. PATENT DOCUMENTS

| | | | |
|---|---|---|---|
| 5,467,342 A | 11/1995 | Longston et al. | |
| 6,766,370 B2 | 7/2004 | Glommen et al. | |
| 7,710,965 B2 | 5/2010 | Liu et al. | |
| 7,881,748 B2 | 2/2011 | Bari et al. | |
| 8,719,452 B1 * | 5/2014 | Ding | H04N 21/4344 709/248 |
| 9,516,039 B1 * | 12/2016 | Yen | H04L 63/14 |
| 2008/0201580 A1 * | 8/2008 | Savitzky | H04L 9/3236 713/189 |
| 2009/0099866 A1 | 4/2009 | Newman | |
| 2011/0035511 A1 | 2/2011 | Biederman | |
| 2014/0089719 A1 * | 3/2014 | Daum | G06Q 10/1093 713/500 |

(Continued)

OTHER PUBLICATIONS

Raghavan et al., "UniTIME: Timestamp interpretation engine for developing unified timelines," IEEE, doi: 10.1109/SADFE.2013.6911546, 2013, pp. 1-7. (Year: 2013).*

(Continued)

*Primary Examiner* — Peter C Shaw
(74) *Attorney, Agent, or Firm* — Fish & Richardson P.C.

(57) ABSTRACT

Methods, systems, and apparatus, including computer programs encoded on computer storage media, for correcting timestamps in computer security telemetry data. A method includes: receiving, at a computer network security data analysis system, first log data identifying a plurality of first events occurring on a computer network, the first log data including, for each first event, a respective first timestamp identifying when the first event occurred, the first timestamp including a first hour value, a first minute value, and a first second value; and generating first modified log data, the first modified log data including, for each first event, a first modified timestamp including the first minute value and the first second value from the log data and a first modified hour value that represents an hour value from a current time at which the first log data was received at the computer network security data analysis system.

11 Claims, 3 Drawing Sheets

(56) References Cited

U.S. PATENT DOCUMENTS

2014/0324786 A1* 10/2014 Li .................. G06F 16/215
                                                        707/690

OTHER PUBLICATIONS

Stavrou et al., "Verified Time", IEEE, doi: 10.1109/MC.2017.63, pp. 78-82, Mar. 2017. (Year: 2017).*
Saidkhodjaev et al., "Aggregating Atomic Clocks for Time-Stamping", IEEE, doi: 10.1109/SOSE49046.2020.00008, 2020, pp. 1-6. (Year: 2020).*

* cited by examiner

300

```
Receive a first log data identifying a plurality of first events occurring on a computer network,
the log data including for, each event, a timestamp identifying when the event occurred and
including an original hour value, an original minute value, and an original second value
305
```

```
Generate modified log data, the modified log data including, for each event, a modified
timestamp including the original minute and second values from the log data and a modified
hour value that represents an hour value from a current time at which the log data was
received at the data analysis system
310
```

```
Store the modified log data
315
```

FIG. 3

CORRECTING TIMESTAMPS FOR COMPUTER SECURITY TELEMETRY DATA

BACKGROUND

This specification generally relates to processing computer security data.

A client network may transmit computer security data to a cybersecurity intelligence platform that can receive and process the security data to present the data to designated users associated with the client network. The users associated with the client network, in turn, can use the data to identify potentially malicious or anomalous network activity. For example, using the data presented by the cybersecurity intelligence platform, the users may determine whether a process is anomalous, malicious, or both, and, if so, perform a corrective action.

The cybersecurity intelligence platform can receive event logs recording information about events occurring during one or more processes executed by computers over a client network to determine whether there is anomalous activity on the client network. An event log can record events, such as requests and receipt of data between one or more servers or other computers. The event log includes timestamps for each event in the log, indicating when the event occurred in the client network.

SUMMARY

This specification describes technologies for correcting time zone information in timestamps of events recorded in a log for a computer network. These technologies generally involve receiving event log data from an event log server of a network of computers, and modifying the timestamps in the event log data to facilitate accurate processing and presentation of the data by a computer network security data analysis system. The computer network security data analysis system can analyze event log data to generate network security data that users of the network of computers sending the event log data can use to determine anomalous activity and security vulnerabilities on the network. The system can modify timestamps having unreliable time zone information using identified reliable sources of time zone information. A reliable source of time zone information may be the system itself or one or more other events with reliable time zone information that are correlated to the events having unreliable timestamps.

In general, one innovative aspect of the subject matter described in this specification can be implemented in methods that include the actions of: receiving, at a computer network security data analysis system, first log data identifying a plurality of first events occurring on a computer network, the first log data including, for each first event, a respective first timestamp identifying when the first event occurred, the first timestamp including a first hour value, a first minute value, and a first second value representing the hour, minute, and second the first event was recorded as occurring; generating first modified log data, the first modified log data including, for each first event, a first modified timestamp including the first minute value and the first second value from the log data and a first modified hour value that represents an hour value from a current time at which the first log data was received at the computer network security data analysis system; and storing, at the computer network security data analysis system, the first modified log data.

Other implementations of this aspect include corresponding computer systems, apparatus, and computer programs recorded on one or more computer storage devices, each configured to perform the actions of the methods.

The foregoing and other implementations can each optionally include one or more of the following features, alone or in combination. In particular, one implementation includes all the following features in combination.

Determining that, for each first event, the respective first timestamp is unreliable; and wherein generating the first modified log data comprises generating the first modified log data only in response to determining that the respective first timestamp is unreliable. Determining that, for each first event, the respective first timestamp is unreliable comprises: determining that the respective first timestamp does not include time zone information.

Determining that, for each first event, the respective first timestamp is unreliable comprises: classifying the time zone information for the respective first timestamp as unreliable.

Receiving, at the computer network security data analysis system, second log data identifying a plurality of second events occurring on the computer network, the second log data including for, each second event, a respective second timestamp identifying when second event occurred, wherein the respective second timestamp includes a second hour value, a second minute value, and a second value; generating second modified log data, comprising, for each second event: identifying, from other log data, a correlated event that is correlated in time with the second event, and generating a second modified timestamp from the second event based on a timestamp for the correlated event.

Optionally, the second log data comprises rules for correlating events recorded in the second log data, and wherein identifying, from other log data, a correlated event that is correlated in time with the second event comprises determining an other event that is correlated with the second event, based on the rules for correlating events in the second log data.

Receiving, at the computer network security data analysis system, second log data identifying a plurality of second events occurring on the computer network, the second log data including, for each second event, a respective second timestamp identifying when the second event occurred, the second timestamp including (i) respective second values for the hour, minute, and second the second event was recorded, and (ii) time zone information representing which time zone the second event was recorded in; generating second modified log data, the second modified log data including, for each second event, a second modified timestamp including the respective second values for the minute and second the second event was recorded and a second modified hour value that represents an hour value from a current time at which the second log data was received at the computer network security data analysis system; and storing, at the computer network security data analysis system, the second modified log data.

The subject matter described in this specification can be implemented so as to realize one or more of the following advantages.

An event log server for a network of computers may not reliably record the time at which events occurred. The resulting event log for the recorded events on the network will likely have inaccurate timestamps, which makes subsequent analysis of the events for malicious or anomalous events more difficult or impossible. By employing the techniques described in this specification, timestamp data can be maintained for accurate analysis regardless of where an event log was generated, i.e., even if the event log was generated by a server that did not reliably record the time at which the events in the log occurred.

For example, in the event of an outage or other situation affecting an event log that would otherwise cause the timestamp data in the log to be deemed unreliable, accurate timestamp data can be robustly maintained with correct time zone information by modifying the data relative to a reliable source, even if a log does not include time zone information at all. The systems and methods described below may allow a system to determine reliable sources for modifying unreliable timestamp data to accurately reflect time zone information for the event associated with the unreliable timestamp data.

The system may determine that it itself is a reliable source of timestamp data. In some implementations, the system may determine that it is not a reliable source for modifying timestamp data, and instead determine reliable timestamp data from reliable timestamps for other events correlated to the event associated with the unreliable timestamp data.

By correcting timestamp data to include accurate time zone information, the system allows for accurate analysis of time-sensitive malicious or anomalous events. For example, if a network security administrator is aware of a breach to the network occurring at a particular time, then she cannot analyze events occurring after the breach for malicious or anomalous activity unless the timestamp data for the events are accurate. The system can allow for accurate security analysis even if a network does not reliably record events occurring within its own network boundaries.

The system can modify timestamp data for events in event logs indiscriminately, i.e., regardless of whether or not the event log has events recorded with unreliable timestamps. For example, the system can modify timestamp data even when the event log does not contain unreliable timestamp data. As a consequence of this indiscriminate modification, the system can guarantee a baseline accuracy of the event logs before being processed by the system, by eliminating the risk of undetected inaccuracies in processed timestamp data.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example process for correcting timestamp data for event logs.

Like reference numbers and designations in the various drawings indicate like elements.

DETAILED DESCRIPTION

Figure 1:
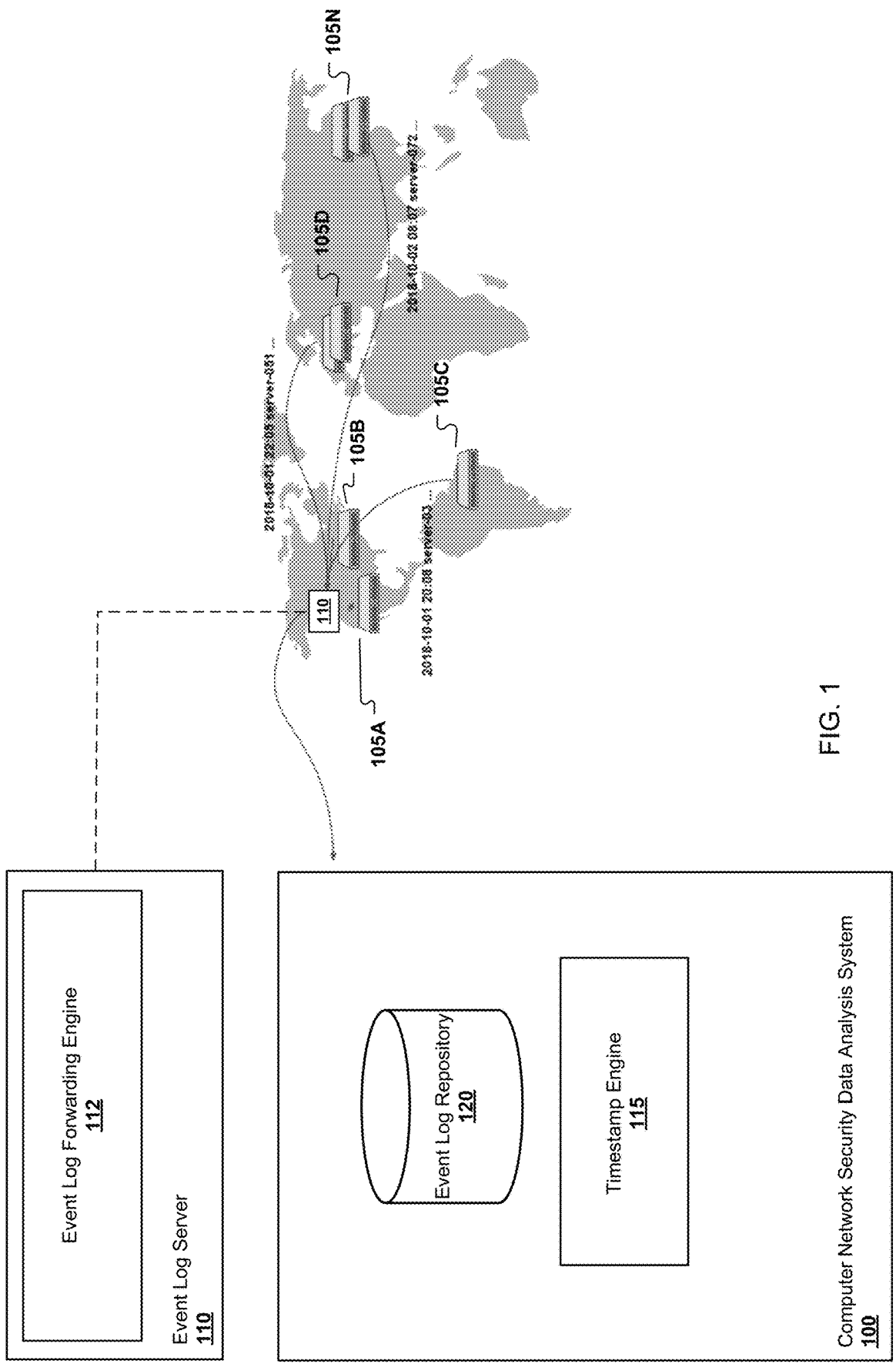
FIG. 1 shows an example computer network security data analysis system that receives respective event logs from an event log server.

A computer network security data analysis system ("system" or "data analysis system") can gather telemetry data, from one or more devices, e.g., servers. The devices can obtain and submit telemetry data to the data analysis system representing activity over a client network, e.g., a network for a client enterprise.

As used in this specification, telemetry data may include statistical information about hardware, software, or both, of a computer. Some examples types of telemetry data include data about a process, a module, a container, a virtual machine, a domain name, a domain name request, a dynamic-link library ("DLL"), another software library, a port number, an internet protocol ("IP") address, a device identifier, or a device type. Telemetry data may be a tuple that includes a value representing a telemetry type and a value for the telemetry type. For instance, a tuple may indicate a process telemetry type and the value may indicate the name of the process. The telemetry value may be any appropriate type of value, such as text for a process name, a number for a port, or an IP address.

A data analysis system can receive telemetry data as one or more event logs of events recorded by a computer, e.g., an event log server designated to record events associated with a respective network of computers. An event is represented as telemetry data and is a request for, or an exchange of, data between computers in a respective network, or between a computer in a respective network and an outside computer. Events can occur internally in the network, e.g., between computers of the respective network, or externally to one or more computers outside of the respective network. Examples of events include, but are not limited to: DNS queries, HTTP/HTTPS requests, FTP requests, establishing network connections, and downloading a file.

In general, the data analysis system can receive event logs from different sources, e.g., event log servers generating event logs for a respective client network of computers. The system can process the event logs and present the data to a present the data to a designated user associated with the client network, e.g., a network administrator for a client network whose event log was sent to the system. The user may analyze events relative to one or more other events in time. For example, the user, using the presented data, may analyze a large increase in traffic across a network over a short period of time to determine whether the network is a target of a distributed denial-of-service attack. As another example, if the user is aware of a breach to the network occurring at a particular time, the user can use the presented data to sort events in the submitted event log to effectively identify malicious or anomalous activity subsequent to the known time of the breach.

Events are recorded according to a predetermined format so the data analysis system can efficiently parse the event log. An event in an event log may be recorded with a timestamp indicating when the event occurred, including time zone information to indicate the time zone the event occurred in. An event record may include additional information, such as a recipient of data, a sender of data, IP addresses of computers implicated in the event, and a description of the type of event.

For example, table 1 shows events recorded in an example event log:

TABLE 1

| Event | Time | Source | Destination | Type |
|---|---|---|---|---|
| 1 | Sat 2019 Jan. 19 11:29:44 PM (PST) | 192.168.1.2 (local-1) | example.com | HTTPS |
| 2 | Sat 2019 Jan. 19 11:29:46 PM (PST) | 192.168.1.2 (local-1) | example.com | HTTP |
| 3 | Sat 2019 Jan. 19 11:30:13 PM (PST) | 192.168.1.2 (local-1) | example.com | File Download |

Table 1 describes a series of events between a local computer with the name local-1 and a local IP address of 192.168.1.2 interacting with a server hosting example.com. Event 1 records an HTTPS event, which may be, for example, a user of the computer local-1 securely logging into example.com. Event 2 records an HTTP event, for example the user of the computer local-1 requesting to load a web page after logging into example.com, without the added security of an HTTPS request. Lastly, event 3 describes a file download event, for example the user of the computer local-1 downloading a file through the web page loaded by the HTTP event recorded in event 2.

In table 1, each logged event additionally includes a timestamp indicating when the respective event occurred. An event log can record the timestamp according to a predefined format, such as the timestamp "Sat 2019-01-19 11:29:44 PM (PST)" for event 1. The timestamp indicates the day of week by the first three letters of the day ("Sat"), the date by "year-month-day" ("2019-01-19"), the time in "hours:minutes:seconds AM/PM" ("11:29:44 PM"), and the time zone ("(PST)"). Alternatively, the timestamp can record the time assuming a 24-hour clock, in which case the same timestamp for event 3 would be recorded as "Sat 2019-01-19 23:30:13 (PST)."

For the system to reliably present events in the event log chronologically, it is important for events to have accurate information related to the time the events occurred. While the format of this time information can vary, as discussed below, it is insufficient for event logs to record events "locally," e.g., by values representing the local hour, minutes, and seconds where the event occurred. This is because event logs can record events occurring on a network that spans across multiple time zones, and the event log server obtaining the event log may not be configured to attach the correct time zone for each event, or adjust recorded times to a common time zone. Alternatively, an event log may include time zone information for some, but not all of the records in the event log, for example because the event log is an aggregation of events recorded across multiple computers in a client network, with some configured to include accurate time zone information and some not. Even if the event log does include time zone information for all of the events, there is no guarantee that the information is accurate.

Therefore, because event logs received by the system can have unreliable, e.g., missing time zone information, and because accurate time information is critical to effective security analysis, the system needs to modify the time zone information in the event log to ensure that timestamps between events can be effectively compared.

Depending on the configuration of the computer generating the event log, the predefined format of each record recording a respective event in an event log may vary. For example, an event log may not include time zone information for the timestamp. For purposes of this specification, a timestamp is assumed to have at least respective values representing an hour, minute, and second indicating when the event occurred. A timestamp may include additional values for increased accuracy, e.g., an additional value representing milliseconds.

FIG. 1 shows an example computer network security data analysis system 100 that receives event logs from an event log server 110. The system 100 engine 112 includes a timestamp engine 115 and an event log repository 120. The event log server 110 can have installed an event log forwarding engine 112 that is configured to forward event logs to the data analysis system 100. The event log forwarding engine 112 may be implemented on a computer or computers different from the event log server 110. In those implementations, the event log forwarding engine 112 may establish a secure connection to the data analysis system 100 for forwarding event logs received by the event log server 110. In some implementations, the event log server 110 can forward event logs directly to the system 100 without an event log forwarding engine installed.

The data analysis system 100 can ingest and process event log data obtained from the event log server 110. The system 100 can present the processed data to users of the client devices 105A-N, e.g., to a network administrator of a client network, to aid the users in monitoring the security of the respective client network. The data analysis system 100 can store event logs in the event log repository 120.

Here, an event log server refers to a server or servers designated in a respective client network for collecting and sending event logs to the data analysis system 100. The event log server 110 can have installed the event log forwarding engine 112, or, in some implementations, the client network can include a separate computer or computers with the event log forwarding engine 112 installed.

A client network is a collection of interconnected client devices, e.g., mobile devices, personal computers, or servers, where events are recorded by the respective event log server for the client network.

The term client network refers to the relationship of the client network as a consumer of a party implementing the data analysis system 100. For example, a client network can be a network for a financial institution, an enterprise, or a custodian of health-care information that subscribes to the party implementing the data analysis system 100 for periodic auditing of the client network for anomalous activity.

While FIG. 1 shows a single client network that includes the event log server 110 and the plurality of client devices 105A-N, it is understood that the data analysis system 100 can receive event logs from event log servers implementing event log forwarding engines on unrelated client networks. For ease of discussion, however, the functionality of the data analysis system 100 is described in reference to a single client network, as shown in FIG. 1.

The event log server 110 may periodically generate event logs in batches of received events, or continuously update a running event log as events occur in the client network for the event log server. In some implementations, the event log server 110, in addition to receiving notification of an event occurring on the respective client network, also receives a timestamp for that event recorded by a computer in the client network where the event originated. For example, if the event is a HTTP event, the computer where the HTTP event originated records the time the event occurred and sends relevant data for the event and the recorded timestamp to the event log server.

The event log server 110 can transmit an event log recording events in the client network to the system 100 using the event log forwarding engine 112. The event log server can send event logs periodically, or send event logs in response to a request by a network administrator or other authority for the client network. For example, the event log server 110 can send event logs to the data analysis system 100 at least every hour, or in smaller increments depending on the client network and the nature of the network security analysis performed by a user of the client network requesting processed data.

Before forwarding the event log to the system 100, the event log server 110 may aggregate internal event logs generated by client devices 105A-N on the client network. For example, one computer in the client network may be a DNS server storing public IP addresses and associated hostnames, while another computer in the client network may be a web proxy server that proxies requests to communicate with servers outside the client network. Both the DNS server and the web proxy server can maintain internal event logs recording events each respective server was involved in. Then, the DNS server and the web proxy can periodically send respective internal event logs to the event log server 110. The event log server 110 can then aggregate the internal event logs and send an aggregated event log to the system 100.

As part of the aggregation of the internal event logs, the event log server 110 can omit duplicate event records, e.g., records of an event between a client device A and a client device B, recorded in respective internal event logs for the client device A and the client device B.

The system 100 can receive event logs from the event log server 110 without receiving any information indicating the physical location of the event log server 110, or the client devices 105A-N. The event log server 110 and the client devices 105A-N may conceal information about their physical location, such as which time zone the event log server 110 is hosted in, to remain anonymous to the data analysis system 100 or to mitigate exposing sensitive information in the case that event logs are compromised, e.g., because the event logs fell into a malicious party's hands. Therefore, in resolving timestamps with inaccurate or missing time zone information in an event log, the data analysis system 100 cannot rely on knowing the physical location of the source of the unreliable event log to correct the timestamps.

Prior to sending the event logs, the event log server 110 through the event log forwarding engine 112 can augment the event logs with additional metadata for the data analysis system 100. Additional metadata can include an event log timestamp indicating when the event log server 110 received the event log, and can also include identifying information about the event log server 110, if available, or information about the format used to record events for the respective event log. Additional metadata can also include a set of rules for correlating events recorded in the respective event log with other events, which will be discussed in detail, below.

The data analysis system 100 can receive a forwarded event log and can process the event log through the timestamp engine 115 to modify the timestamps in the event log. Specifically, the timestamp engine 115 can process each forwarded event log and can modify the timestamp to include corrected time zone information for each event record. Because the timestamp engine 115 can efficiently parse and modify event logs as encoded text, the timestamp engine 115 may process each event log as a pre-processing step for the data analysis system 100. Modifying timestamps for events in an event log is discussed with reference to FIG. 2, below.

The system 100 can then extract data from the corrected event logs to present to a requesting user of the client network, e.g., through a user interface on a display of a device. The system 100 can process the extracted data, e.g., by filtering or sorting the data, in response to a request by the user. The system 100 can also compare points of data representing network activity for a respective client network, as well as track a history of events obtained from prior event logs received for the client network and stored on the event log repository 120. The system can accurately sort or filter event records in event logs temporally because the system 100, as a pre-processing step, corrected the timestamp for each event record.

Figure 2:
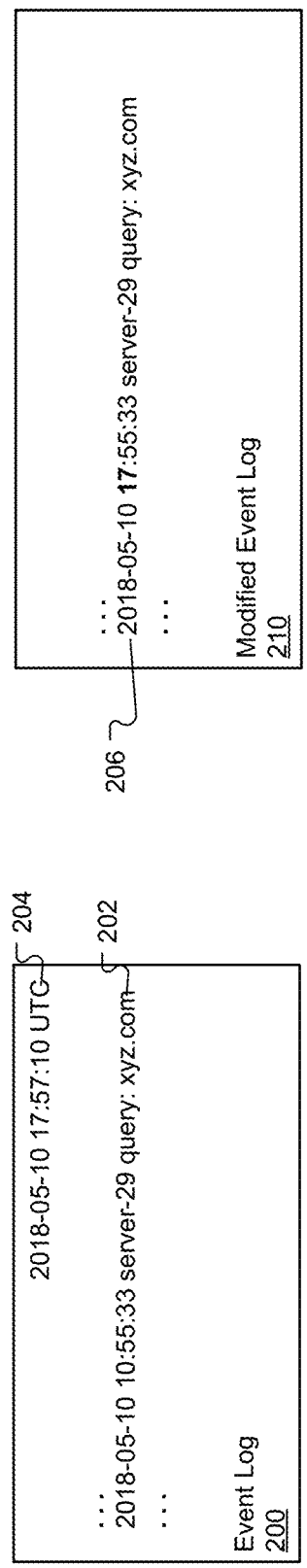
FIG. 2 is an example of an event log forwarded to the data analysis system before and after the timestamp engine modifies the event log.

FIG. 2 is an example of an event log 200 forwarded to the data analysis system 100 before and after the timestamp engine 115 modifies the event log 200. The forwarded event log 200 includes event record 202: "2018-05-10 10:55:33 server-29 query: xyz.com." The event record 202 could represent, for example, a query to xyz.com by a server labeled server-29 in a client network. Further, the event record 202 indicates that the recorded event took place on May 10, 2018 at 10:55:33 (measured on a 24-hour clock), but does not include time zone information.

Because the time zone information for the event record 202 is missing, the timestamp engine 115 is configured to modify the timestamps in the forwarded event log 200 to include corrected time zone information for each event record, based on time tracked by the system 100. When the system 100 receives the forwarded event log 200, the timestamp engine 115 can append as metadata the current time when the forwarded event log was received. For example, event log 200 includes a received event log timestamp 204 of "2018-05-10 17:57:10 UTC." The event log timestamp 204 indicates that the timestamp engine 115 received the event log 200 on May 10, 2018, at 17:57:10 coordinated universal time ("UTC").

The timestamp engine 115 can take the event log 200 and modify all of the timestamps to reflect the hour in which the system 100 received the event log 200. The minute and second value for the timestamps are left unaltered, i.e., left to the local time recorded when the event took place. For example, if the system 100 receives the event log 200 at 12:00 PM, the timestamp engine 115 can modify the event record 202 from 10:55:33 to 12:55:33, reflecting the local time when the system 100 received the event log 200. A modified event log 210 generated by modifying the event log 200 includes an event record 206: "2018-05-10 12:55:33 server-29 query: xyz.com," corresponding to the event record 202 and reflecting: (i) the hour the system 100 received the event log 200, and the (ii) local minutes and seconds recorded when the event took place.

The timestamp engine 115 can keep track of the relative order of timestamps in an event log to preserve the relative order after the timestamps are modified. For example, consider an event log with three events, recorded at 12:58:00, 12:59:00, and 13:00:00, respectively.

The timestamp engine 115 can modify the event records of an event log chronologically, e.g., from the first event record to the last event record. The timestamp engine 115 can further keep track of when the minute value of the timestamps resets back to 00, indicating the start of a new number. In response, the timestamp engine 115 can appropriately increment the modified hour value by one to reflect timestamps recording events that occurred during the subsequent hour.

Therefore, in the example above, if the local time was 16:00:00 UTC when the timestamp engine 115 received the event log, then the timestamp engine 115 can modify the timestamps for the three event records to be 16:58:00 UTC, 16:59:00 UTC, and 17:00:00 UTC, respectively.

The timestamp engine 115 can also modify the hour value in a timestamp in an event record to a predetermined time zone. In some implementations, instead of modifying the hour value of the timestamp in the event record 202 to match the hour local to the system 100 when the event log 200 was received, the system 100 instead can modify the hour value of the timestamp in the event record 202 to reflect a predetermined time zone, such as UTC.

After the timestamp engine 115 modifies the forwarded event log, the data analysis system 100 can store the modified event log in the event log repository 120. The data analysis system 100 can then retrieve event logs from the event log repository 120 and process data extracted from the event logs before presenting the data to a user of a client network corresponding to the event logs.

Timestamp modification of event logs is often necessary because, as indicated above, events in a respective event log may not be recorded with time zone information.

Alternatively, a client network may include computers that are across different time zones, but event logs for that client network are recorded with an inaccurate mapping of time zones to computers in the client network, making the timestamp data unreliable. Since it can be difficult to identify whether time zone information is accurate for an event log, and coupled with the availability of efficient processing of even very large event logs, the timestamp engine 115 is configured in some implementations to always modify timestamps according to the time recorded by the system 100. As discussed above, the timestamp engine 115 can modify the hour value of a timestamp for an event record in an event log. In general, ensuring the accuracy of the hour value of each timestamp is important to analyzing the chronology of events occurring on a client network. This is because, while the hour value may vary depending on how reliable an event log server for a client network is in maintaining a consistent time zone for each event record, the minute and second value are more likely to be consistent between timestamps.

If, for example, an event log server was off by some fixed amount of time, e.g., 2 seconds, then, in general, all of the events will be recorded with a timestamp offset by the fixed amount. Relative to each other, however, the events will still be recorded accurately. However, if the timestamps are inconsistent in applying time zone information, then events can be recorded out of order, by an hour or more.

The system can modify timestamp data for each event record in an event log, when the event log contains both (i) event records that were recorded with accurate time zone information and (ii) event records that were not recorded with accurate time zone information, or not recorded with time zone information at all. By indiscriminately modifying event logs with both reliable and unreliably recorded event records, the system can enforce a baseline accuracy of the event logs, before processing. In some implementations, the system can modify the timestamps for events in event logs that were recorded with accurate time zone information, as a precautionary measure to guarantee that the event log has accurate timestamp data before being processed by the system.

FIG. 3 is a flowchart of an example process 300 for correcting timestamp data for event logs. For convenience, the process 300 will be described as being performed by a system of one or more computers, located in one or more locations, and programmed appropriately in accordance with this specification. For example, a computer network security data analysis system, e.g., the computer network security data analysis system 100 of FIG. 1, appropriately programmed, can perform the process 300.

The data analysis system receives first log data identifying a plurality of first events occurring on a computer network, the log data including for, each event, a timestamp identifying when the event occurred and including an original hour value, an original minute value, and an original second value (305). As discussed above with reference to FIG. 1 and FIG. 2, the data analysis system receives an event log comprising log data for events, with associated timestamps for each record in the log data.

The data analysis system generates modified log data, the modified log data including, for each event, a modified timestamp including the original minute and second values from the log data and a modified hour value that represents an hour value from a current time at which the log data was received at the data analysis system (310). As discussed above with reference to FIG. 1 and FIG. 2, the system, through the timestamp engine, records a time at which the system received the event log. The timestamp engine uses the event log timestamp for a forwarded event log to modify the original hour value for each timestamp of each record in the forwarded event log.

The data analysis system stores the modified log data (315). For example, as discussed above with reference to FIG. 1, the data analysis system can store event logs in the event log repository. The data analysis system can then analyze the modified log data to identify anomalous activity.

In some implementations, the timestamp engine 115 can first determine whether timestamp modification in a forwarded event log is necessary, i.e., by determining whether the event log is reliable or unreliable. If an event log is deemed unreliable, then the timestamp engine 115 can process the event log as described above to modify the timestamp data for the event log. In some implementations, the data analysis system 100 can performs the process to generate modified timestamp data as discussed above whether or not an event log is deemed unreliable.

Event reliability refers to the confidence of the data analysis system 100 that information about the occurrence of recorded events in an event log is accurate and ready for the data analysis system 100 to analyze without pre-processing, e.g., by the timestamp engine 115 to obtain modified and accurate timestamps. More specifically, event log reliability refers to whether timestamps for one or more records in an event log contain accurate time zone information. For example, a timestamp without accurate time zone information is considered unreliable. In this specification, an event log as a whole may be deemed unreliable if at least some portion of the timestamps for the event records in the event log is deemed unreliable.

An event log may be deemed unreliable for different reasons, and may depend on different factors, such as the origin of the event log or reported network outages for the client network and/or the data analysis system 100. For example, an event log may be deemed unreliable if some or all of the event records in the event log are missing time zone information. As another example, the event logs sent by a particular event log server to the system 100 may be deemed unreliable by the timestamp engine 115, because the particular event log server is known by the data analysis system 100 to not provide accurate time zone information. As another example, the system 100 may track occurrences of reported network outages and/or missed event logs from a particular event log server, and deem that event log server unreliable as a result.

Additionally, an event log may be deemed unreliable even if the data in the event log is technically accurate. This is because reliability of an event log refers to the content of the log and the circumstances of its receipt by the system 100. Even when the reliability is very high, the data analysis system 100 may still pre-process event logs through the timestamp engine 115 to ensure accurate timestamp data as discussed above, rather than risk analyzing an inaccurate event log.

Event logs may also be deemed unreliable because of circumstances occurring within the data analysis system 100. In some implementations, an administrator for the data analysis system 100 may deem event logs unreliable for any reason, causing the data analysis engine 100 to pre-process forwarded event logs using the timestamp engine 115 before data analysis.

Another example of when the data analysis system 100 may deem a forwarded event log unreliable is if a certain period of time occurs between an event log server sending an event log to the system 100 and the timestamp engine 115 generating a timestamp for the received event log. This situation may arise, for example, because of a delay in transmission of the event log, a long queue of event logs for the event log server 110 to forward to the data analysis system 100 resulting in a backlog, or an outage by one or both of the computer or computers implementing the timestamp engine 115 and the event log server 110 sending the event log.

An event log can also been deemed unreliable as a result of manual analysis by users of the client network, as well as by administrators maintaining the data analysis system 100.

In these situations where event logs are deemed unreliable because of circumstances occurring within the data analysis system 100, it is necessary for the timestamp engine 115 to modify timestamp data of forwarded event logs by correlating unreliable event logs with reliable event logs from client devices within the client network. In situations where event logs are deemed unreliable because of circumstances occurring outside of the data analysis system 100, the timestamp engine 115 may still correlate unreliable event logs with reliable event logs to determine modified timestamps for forwarded event logs, either as an alternative or in addition to the process discussed with respect to FIG. 3.

Therefore, the timestamp engine 115 cannot always rely on the time the system 100 received an unreliable event log, and instead must identify accurate time zone information from other reliable event logs that are correlated to the unreliable event logs.

In some implementations, a first event and a second event in an event log are considered correlated when the first event is dependent on the second event occurring. The timestamp engine 115 can determine event dependencies, for example, in client networks implementing conventional protocols for transmitting data, wherein each step of the protocol is a separate recorded event, such that one event necessarily comes before or after another event.

For example, such a sequence of events can occur in a computer attempting to connect to an external server via TCP/IP. Generally, the computer specifies through a web browser, a URL to connect to a particular server hosting a website ("browser request event"). The browser makes a DNS look-up request with a DNS server to determine the IP address for the external server ("DNS look-up event"). The browser establishes a connection with the external server using the IP address ("connection request event"), and after receiving an acknowledgement from the external server, sends HTTP/HTTPS requests to obtain content from the external server ("HTTP request event"). In this example, the events are correlated, because a browser request event occurs before a DNS look-up event, which occurs before a connection request event, which occurs before an HTTP request event.

If any one of the correlated events described above includes a reliable timestamp, then the timestamp engine can use that reliable timestamp to modify the timestamps for the other correlated events. For example, if the HTTP request event had unreliable timestamp data but the correlated DNS look-up event had reliable timestamp data, the timestamp engine 115 can modify time zone information of the timestamp for the HTTP request event according to the timestamp of the DNS look-up event.

In some implementations, the event log server 110 can provide the system 100 with rules for correlated events unique to the client network. For example, the event log server 110 can indicate that it follows standard protocols for data transmission, such as HTTP or FTP, or that it follows an esoteric protocol unique to the respective client network for the event log server 110. If the latter, the timestamp engine 115 can be configured to receive the rules for correlated events unique to the client network and apply those rules to determine whether the event log contains correlated events.

As a simple illustration, a client network can include a DNS server and a web proxy server, and each server maintains an internal event log that is sent to the respective event log server for the client network, where the event log server aggregates the internal event logs into one event log that is forwarded to the data analysis system. In this illustration, the web proxy server is not configured to provide time zone information in timestamps for events it recorded in its internal event log. The DNS server, however, does provide time zone information. The event log for this illustration can include a DNS look-up event for example-.com and a web proxy request event for example.com Continuing this illustration, when the data analysis system receives the forwarded event log, the data analysis system will deem it unreliable, because a portion of timestamps, i.e., the timestamps for events recorded by the web proxy server, does not contain time zone information. The data analysis system additionally receives rules from the event log server indicating that DNS look-up events are correlated to web proxy request events to the same external website. The timestamp engine can correlate the web proxy request events to DNS look-up events for the same external website. Then, the timestamp engine can modify the unreliable timestamps for the web proxy request events using the timestamps of correlated DNS look-up events, after determining that the timestamps of the correlated DNS look-up events are reliable.

The data analysis system can correlate events across multiple event logs. For example, the data analysis system receives event logs from multiple event log servers of multiple client networks that are known to the data analysis system to communicate with one another. If one event log contains unreliable timestamps for some or all of the records in the respective event log, the data analysis system can refer to the set of rules for correlations for one or both of the event log servers to determine whether the records having unreliable timestamps are correlated to any events having reliable timestamps.

The data analysis system can correlate events across multiple event logs recording events for the same stream of data in a network. For example, if a network is organized so that all outbound traffic passes through both a network switch and a proxy server, the system can correlate events in respective event logs for the switch and the proxy server. If, for example, the proxy server was not configured to record events with time zone information, then the events in the event log for the proxy server can be correlated to events in the event log for the switch, because the same network traffic flows through both the proxy server and the switch. In some implementations, the system can correlate DNS activity recorded by an endpoint agent, e.g., a user device, on the network with corresponding DNS requests received and logged by a DNS server on the network. In some implementations, the system can correlate file download activity recorded by an endpoint agent with HTTP/HTTPS activity recorded by a proxy server.

As used in this specification, the term "engine" or "software engine" refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
   one or more computers and one or more storage devices on which are stored instructions that are operable, when executed by the one or more computers, to cause the one or more computers to perform operations comprising:
   receiving, at a computer network security data analysis system, first log data identifying a plurality of first events occurring on a computer network, the first log data including, for each first event, a respective first timestamp identifying when the first event occurred, the first timestamp including a first hour value, a first minute value, and a first second value representing the hour, minute, and second the first event was recorded as occurring;
   generating first modified log data, the first modified log data including, for each first event, a first modified timestamp including the first minute value and the first second value from the log data and a first modified hour value that represents an hour value from a current time at which the first log data was received at the computer network security data analysis system;
   storing, at the computer network security data analysis system, the first modified log data;
   determining that, for each first event, the respective first timestamp is unreliable by determining that the respective first timestamp does not include time zone information and classifying the time zone information for the respective first timestamp as unreliable;
   wherein generating the first modified log data comprises generating the first modified log data only in response to determining that the respective first timestamp is unreliable.

2. A system comprising:
   one or more computers and one or more storage devices on which are stored instructions that are operable, when executed by the one or more computers, to cause the one or more computers to perform operations comprising:
   receiving, at a computer network security data analysis system, first log data identifying a plurality of first events occurring on a computer network, the first log data including, for each first event, a respective first timestamp identifying when the first event occurred, the first timestamp including a first hour value, a first minute value, and a first second value representing the hour, minute, and second the first event was recorded as occurring;
   generating first modified log data, the first modified log data including, for each first event, a first modified timestamp including the first minute value and the first second value from the log data and a first modified hour value that represents an hour value from a current time at which the first log data was received at the computer network security data analysis system;
   storing, at the computer network security data analysis system, the first modified log data;
   receiving, at the computer network security data analysis system, second log data identifying a plurality of second events occurring on the computer network, the second log data including for, each second event, a respective second timestamp identifying when second event occurred, wherein the respective second timestamp includes a second hour value, a second minute value, and a second value;

generating second modified log data, comprising, for each second event:
  identifying, from other log data, a correlated event that is correlated in time with the second event, and
  generating a second modified timestamp from the second event based on a timestamp for the correlated event.

3. The system of claim 2, wherein the second log data comprises rules for correlating events recorded in the second log data, and wherein identifying, from other log data, a correlated event that is correlated in time with the second event comprises determining an other event that is correlated with the second event, based on the rules for correlating events in the second log data.

4. A system comprising:
  one or more computers and one or more storage devices on which are stored instructions that are operable, when executed by the one or more computers, to cause the one or more computers to perform operations comprising:
    receiving, at a computer network security data analysis system, first log data identifying a plurality of first events occurring on a computer network, the first log data including, for each first event, a respective first timestamp identifying when the first event occurred, the first timestamp including a first hour value, a first minute value, and a first second value representing the hour, minute, and second the first event was recorded as occurring;
    generating first modified log data, the first modified log data including, for each first event, a first modified timestamp including the first minute value and the first second value from the log data and a first modified hour value that represents an hour value from a current time at which the first log data was received at the computer network security data analysis system;
    storing, at the computer network security data analysis system, the first modified log data;
    receiving, at the computer network security data analysis system, second log data identifying a plurality of second events occurring on the computer network, the second log data including, for each second event, a respective second timestamp identifying when the second event occurred, the second timestamp including (i) respective second values for the hour, minute, and second the second event was recorded, and (ii) time zone information representing which time zone the second event was recorded in;
    generating second modified log data, the second modified log data including, for each second event, a second modified timestamp including the respective second values for the minute and second the second event was recorded and a second modified hour value that represents an hour value from a current time at which the second log data was received at the computer network security data analysis system; and
    storing, at the computer network security data analysis system, the second modified log data.

5. A computer-implemented method, comprising:
  receiving, at a computer network security data analysis system, first log data identifying a plurality of first events occurring on a computer network, the first log data including, for each first event, a respective first timestamp identifying when the first event occurred, the first timestamp including a first hour value, a first minute value, and a first second value representing the hour, minute, and second the first event was recorded as occurring;
  generating first modified log data, the first modified log data including, for each first event, a first modified timestamp including the first minute value and the first second value from the log data and a first modified hour value that represents an hour value from a current time at which the first log data was received at the computer network security data analysis system; and
  storing, at the computer network security data analysis system, the first modified log data;
  determining that, for each first event, the respective first timestamp is unreliable by determining that the respective first timestamp does not include time zone information and classifying the time zone information for the respective first timestamp as unreliable;
  wherein generating the first modified log data comprises generating the first modified log data only in response to determining that the respective first timestamp is unreliable.

6. A computer-implemented method, comprising:
  receiving, at a computer network security data analysis system, first log data identifying a plurality of first events occurring on a computer network, the first log data including, for each first event, a respective first timestamp identifying when the first event occurred, the first timestamp including a first hour value, a first minute value, and a first second value representing the hour, minute, and second the first event was recorded as occurring;
  generating first modified log data, the first modified log data including, for each first event, a first modified timestamp including the first minute value and the first second value from the log data and a first modified hour value that represents an hour value from a current time at which the first log data was received at the computer network security data analysis system;
  storing, at the computer network security data analysis system, the first modified log data;
  receiving, at the computer network security data analysis system, second log data identifying a plurality of second events occurring on the computer network, the second log data including for, each second event, a respective second timestamp identifying when second event occurred, wherein the respective second timestamp includes a second hour value, a second minute value, and a second value;
  generating second modified log data, comprising, for each second event:
    identifying, from other log data, a correlated event that is correlated in time with the second event, and
    generating a second modified timestamp from the second event based on a timestamp for the correlated event.

7. The method of claim 6, wherein the second log data comprises rules for correlating events recorded in the second log data, and wherein identifying, from other log data, a correlated event that is correlated in time with the second event comprises determining an other event that is correlated with the second event, based on the rules for correlating events in the second log data.

8. A computer-implemented method, comprising:
  receiving, at a computer network security data analysis system, first log data identifying a plurality of first events occurring on a computer network, the first log data including, for each first event, a respective first timestamp identifying when the first event occurred, the first timestamp including a first hour value, a first minute value, and a first second value representing the hour, minute, and second the first event was recorded as occurring;

generating first modified log data, the first modified log data including, for each first event, a first modified timestamp including the first minute value and the first second value from the log data and a first modified hour value that represents an hour value from a current time at which the first log data was received at the computer network security data analysis system;

storing, at the computer network security data analysis system, the first modified log data;

receiving, at the computer network security data analysis system, second log data identifying a plurality of second events occurring on the computer network, the second log data including, for each second event, a respective second timestamp identifying when the second event occurred, the second timestamp including (i) respective second values for the hour, minute, and second the second event was recorded, and (ii) time zone information representing which time zone the second event was recorded in;

generating second modified log data, the second modified log data including, for each second event, a second modified timestamp including the respective second values for the minute and second the second event was recorded and a second modified hour value that represents an hour value from a current time at which the second log data was received at the computer network security data analysis system; and storing, at the computer network security data analysis system, the second modified log data.

9. One or more non-transitory computer-readable storage media encoded with instructions that, when executed by one or more computers, cause the one or more computers to perform operations comprising:

receiving, at a computer network security data analysis system, first log data identifying a plurality of first events occurring on a computer network, the first log data including, for each first event, a respective first timestamp identifying when the first event occurred, the first timestamp including a first hour value, a first minute value, and a first second value representing the hour, minute, and second the first event was recorded as occurring;

generating first modified log data, the first modified log data including, for each first event, a first modified timestamp including the first minute value and the first second value from the log data and a first modified hour value that represents an hour value from a current time at which the first log data was received at the computer network security data analysis system; and storing, at the computer network security data analysis system, the first modified log data;

determining that, for each first event, the respective first timestamp is unreliable by determining that the respective first timestamp does not include time zone information and classifying the time zone information for the respective first timestamp as unreliable;

wherein generating the first modified log data comprises generating the first modified log data only in response to determining that the respective first timestamp is unreliable.

10. One or more non-transitory computer-readable storage media encoded with instructions that, when executed by one or more computers, cause the one or more computers to perform operations comprising:

receiving, at a computer network security data analysis system, first log data identifying a plurality of first events occurring on a computer network, the first log data including, for each first event, a respective first timestamp identifying when the first event occurred, the first timestamp including a first hour value, a first minute value, and a first second value representing the hour, minute, and second the first event was recorded as occurring;

generating first modified log data, the first modified log data including, for each first event, a first modified timestamp including the first minute value and the first second value from the log data and a first modified hour value that represents an hour value from a current time at which the first log data was received at the computer network security data analysis system;

storing, at the computer network security data analysis system, the first modified log data;

receiving, at the computer network security data analysis system, second log data identifying a plurality of second events occurring on the computer network, the second log data including for, each second event, a respective second timestamp identifying when second event occurred, wherein the respective second timestamp includes a second hour value, a second minute value, and a second value;

generating second modified log data, comprising, for each second event:
identifying, from other log data, a correlated event that is correlated in time with the second event, and
generating a second modified timestamp from the second event based on a timestamp for the correlated event.

11. One or more non-transitory computer-readable storage media encoded with instructions that, when executed by one or more computers, cause the one or more computers to perform operations comprising:

receiving, at a computer network security data analysis system, first log data identifying a plurality of first events occurring on a computer network, the first log data including, for each first event, a respective first timestamp identifying when the first event occurred, the first timestamp including a first hour value, a first minute value, and a first second value representing the hour, minute, and second the first event was recorded as occurring;

generating first modified log data, the first modified log data including, for each first event, a first modified timestamp including the first minute value and the first second value from the log data and a first modified hour value that represents an hour value from a current time at which the first log data was received at the computer network security data analysis system;

storing, at the computer network security data analysis system, the first modified log data;

receiving, at the computer network security data analysis system, second log data identifying a plurality of second events occurring on the computer network, the second log data including, for each second event, a respective second timestamp identifying when the second event occurred, the second timestamp including (i) respective second values for the hour, minute, and second the second event was recorded, and (ii) time zone information representing which time zone the second event was recorded in;

generating second modified log data, the second modified log data including, for each second event, a second modified timestamp including the respective second values for the minute and second the second event was recorded and a second modified hour value that represents an hour value from a current time at which the second log data was received at the computer network security data analysis system; and storing, at the computer network security data analysis system, the second modified log data.

\* \* \* \* \*